(12) United States Patent
Mambrini

(10) Patent No.: US 6,886,594 B2
(45) Date of Patent: May 3, 2005

(54) ON-OFF VALVE, PARTICULARLY FOR INSULATION BY-PASS OF EXHAUST GAS EXPANSION TURBINES OF CATALYTIC CRACKING PLANTS

(75) Inventor: Luca Mambrini, Cagliari (IT)

(73) Assignee: Remosa S.p.A., Cagliari (IT)

( * ) Notice: Subject to any disclaimer, the term of this patent is extended or adjusted under 35 U.S.C. 154(b) by 0 days.

(21) Appl. No.: 10/400,916

(22) Filed: Mar. 28, 2003

(65) Prior Publication Data

US 2003/0183284 A1 Oct. 2, 2003

(30) Foreign Application Priority Data

Mar. 29, 2002 (IT) .................................... RM2002A0180

(51) Int. Cl.[7] ................................................ F16K 3/04
(52) U.S. Cl. ..................... 137/613; 137/559; 251/298; 251/284; 251/359
(58) Field of Search ............................... 251/284, 359, 251/298, 314, 316, 317, 317.01; 137/613, 614.13, 614.21, 559

(56) References Cited

U.S. PATENT DOCUMENTS 3,854,497 A * 12/1974 Rosenberg .................. 137/559
4,846,212 A * 7/1989 Scobie et al. ............... 137/613

* cited by examiner

Primary Examiner—Kevin Lee
(74) Attorney, Agent, or Firm—Arent Fox, PLLC

(57) ABSTRACT

The invention relates to on-off valve, particularly for insulation by-pass of exhaust gas expansion turbines of catalytic cracking plants, of the type comprising a hollow valve body, an opening for the inlet of the gas into the valve, an opening for the outlet of the gas from the valve, at least a shutter and the relevant at least one seat, the valve being characterized in that it comprises a conduit coupled to the inlet opening and a conduit coupled to the outlet opening, the at least one seat being coupled to the inlet conduit or to the outlet conduit and the at least one shutter having a cover shape and sealing engaging with the seat by a rotatory motion transmitted to the shutter by an actuator by a drive shaft and a drive arm.

19 Claims, 8 Drawing Sheets

ON-OFF VALVE, PARTICULARLY FOR INSULATION BY-PASS OF EXHAUST GAS EXPANSION TURBINES OF CATALYTIC CRACKING PLANTS

The present invention relates to an on-off valve, particularly for insulation by-pass of exhaust gas expansion turbines of catalytic cracking plants.

1. Field of the Invention

The invention relates to the field of the interception of tubes within which a fluid flow passes, preferably a gaseous fluid, in order to insulate a portion, e.g. for allowing maintenance interventions. Particularly, the valve according to the present invention can be advantageously used to intercept conduits connecting a catalytic cracking plant and an expansion turbine system for the production of mechanical energy by the overpressure of the exhaust gas of the cracking plant.

As it is well known, fluid bed catalytic cracking (FCC fluid catalytic cracking plants) produce a large amount of exhaust gases from the reactor for the regeneration of the catalyst. This gas, at a temperature of 700–800° C. and at a pressure of 30–40 atm, before being torch burnt, passes through different heat exchangers to recover heat and a turbine system for the production of mechanical energy by the expansion.

2. Related Art

Turbine system can need maintenance work and for this reason must be insulated from the plant.

SUMMARY OF THE INVENTION

At present, this operation is carried out by a series of passages due, on one side, to operation needing of the upward plant, and, on the other side, to safety needing for the maintenance workers.

Particularly, it is very important that the closure of the circuit toward the turbines occurs along with the opening of a by-pass circuit of the same system, designed in such a way that pressure losses through said by-pass circuit are the same of the losses that, when operating at regime, would have occurred in the system comprised of the turbines and of the relevant circuit. Furthermore, the passage between the two circuits must almost be immediate, in such a way not to create dangerous pressure rushes that would jeopardize the proper operation of the catalytic cracking plants.

This particular needing is solved by the use of butterfly valves, both on the circuit toward the turbines and on the by-pass circuit, said butterfly valves, thanks to their actuating speed, allow fulfilling the necessary operation requirements.

However, in view of the not perfect sealing of the butterfly valves, due to the constructive mode of the same, safety needing imposes to use them along with the insertion on the line of blind discs flanged to the tube, in such a way to obtain a complete insulation of the circuit portion destined to the maintenance.

The not perfect sealing features of the butterfly valves make also potentially dangerous the operation of introduction of these safety elements.

In this situation it is included the solution according to the present invention proposing to provide an on-off valve for the fully safe insulation of a line, preferably a gas line.

These and other results are obtained according to the present invention, suggesting a valve comprised of one or more shutter covers, sealing engaging on the relevant seats, realized in such a way to ensure a seal remarkably better than that guaranteed by the known valves, and placed in such a way that, when the shutters are in the open position, the presence of the valve on the line involves minimum pressure losses.

Furthermore, the valve according to the present invention can be easily installed also on already existing plants.

It therefore a first specific object of the present invention a on-off valve, particularly for insulation by-pass of exhaust gas expansion turbines of catalytic cracking plants, of the type comprising a hollow valve body, an opening for the inlet of the gas into the valve, an opening for the outlet of the gas from the valve, at least a shutter and the relevant at least one seat, said valve comprising a conduit coupled to the inlet opening and a conduit coupled to the outlet opening, said at least one seat being coupled to the inlet conduit or to the outlet conduit and said at least one shutter having a cover shape and sealing engaging with said seat by a rotatory motion transmitted to the shutter by an actuator by a drive shaft and a drive arm.

Preferably, according to the invention, the on-off valve comprises two shutters, each one with its relevant seat, respectively in correspondence of the inlet conduit and of the outlet conduit; said seats being spaced each other to minimize the flow turbulence of the gas crossing the open valve and the interference of the opening and closure movements of the two shutters.

Particularly, according to the invention, said at least one shutter can be provided with a rib close to, and all along, its perimeter, sealing engaging on a corresponding groove on the seat, of with a groove close to, and all along, its perimeter, sealing engaging on a corresponding rib on the seat.

Preferably, in case two shutters are provided, shutter faced toward the valve inlet is provided with a groove for engagement with a rib on the relevant seat while that one faced toward the outlet of the valve is provided with a rib for engagement on a groove on the relevant seat.

Specifically, always according to the invention, said rib is cut from a lengthened groove realizing a room increasing the sealing.

Still according to the invention, said shutter is coupled to said transmission arm by an articulation leaving to the shutter the possibility of conforming to the seat during the closure operation, said articulation preferably comprising a plurality of threaded pins provided about the center of the shutter, limiting the amplitude of the movements of the shutter about the drive arm, and at the center of which a spherical joint is provided.

Furthermore, the on-off valve according to the invention, comprises means for the optimum positioning of the shutter with respect to the drive arm during its approaching to the relevant seat, preferably comprising at least a spiral spring resting on the drive arm and acting on a pin constrained to the end of the shutter closer to the drive shaft, approaching said shutter end to said drive arm.

Always according to the invention, the valve further comprises a mechanical stop for each shutter limiting the maximum opening of the same, at least a bonification conduit for inlet of overpressure gas within the valve, e.g. nitrogen, at least a conduit lubrication of the motion parties within the valve, at least one valve for evacuation of possibly present liquids, at least an inspection window.

It is further a second specific object of the present invention, an on-off system of a conduit through which a fluid passes, particularly a gaseous fluid, comprising two valves according to the invention, placed in two different points of the conduit.

It is well evident the efficiency of a valve and of a system according to the present invention.

Particularly, a valve of the above kind guarantees seal, noticeably better than that required by the specific rules, could even make superfluous the use of blind discs.

Furthermore, in case of a valve provided with two shutters, introducing an overpressure inert gas within the body valve, sealing features are further improved, while in case of a system using two valves provided with a single shutter, placed in two different points, even distant each other along the line, said introduction of inert gas can be used to obtain at the same time a bonification of the plant part included between the two valves.

BRIEF DESCRIPTION OF THE DRAWINGS

The present invention will be now described, for illustrative but not limitative purposes, according to its preferred embodiments, with particular reference to the figures of the enclosed drawings, wherein.

DETAILED DESCRIPTION OF THE DRAWINGS

Figure 1:
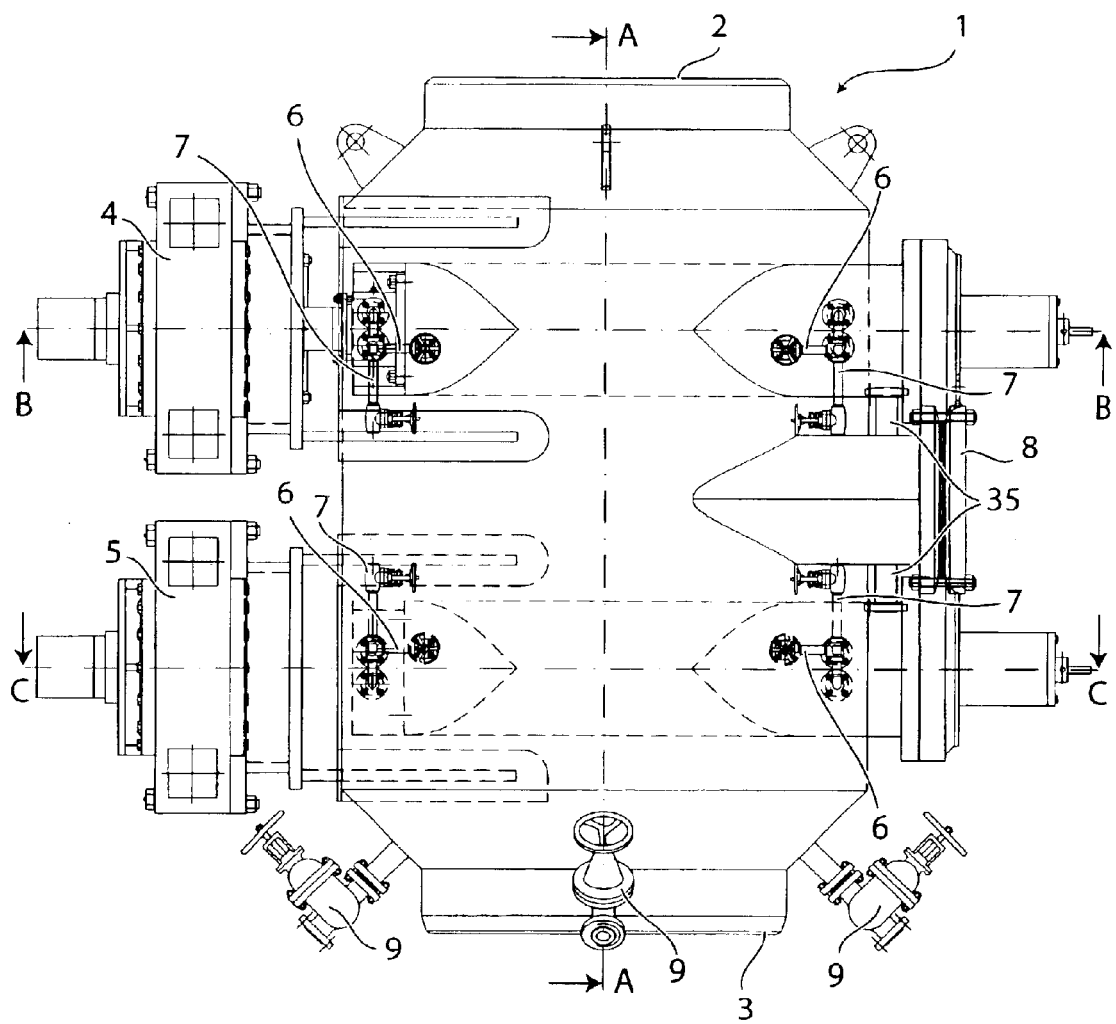
FIG. 1 is a front view of an embodiment of an on-off valve according to the present invention.

Making first reference to FIG. 1, it is shown the substantially cylindrical, hollow valve body 1, provided with an opening 2 for the inlet of the gas, and with an opening for the outlet of the gas, two actuators 4 and 5, respectively to actuate two shutters (not shown), with four bonification conduits 6, placed outside the valve, for introducing overpressurized inert gas, preferably nitrogen, within the valve, to prevent losses through the clearance necessary to the movement of the drive shaft and to inertize the valve during the closure phase, with the same number of lubrication conduits 7 for the parts moving within the valve, with an inspection window 8 and with four gate valves 9, three of which are shown in the figure, for emptying the valve from possibly present liquids.

Figure 2:
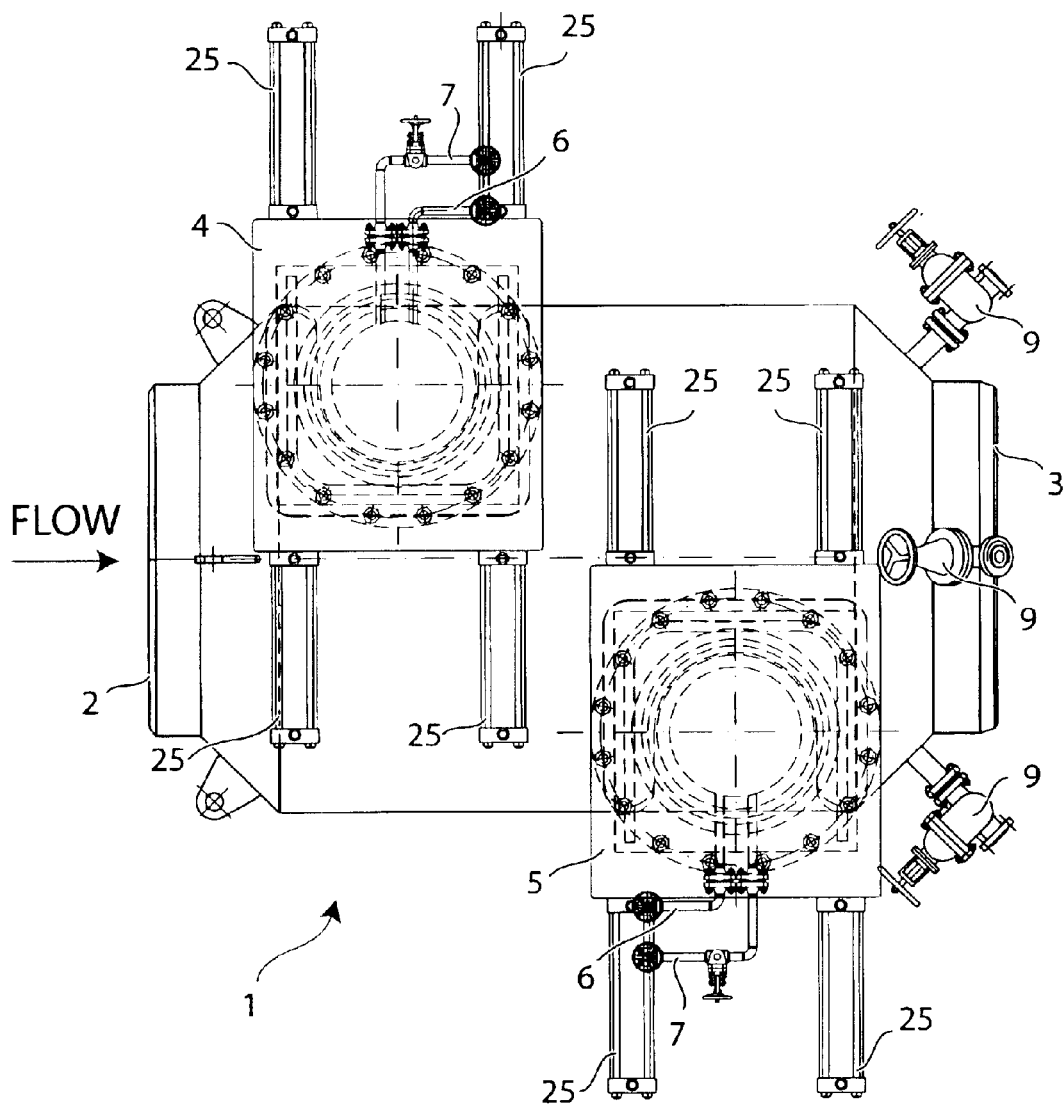
FIG. 2 is a first lateral view of the valve according to FIG. 1.
Figure 3:
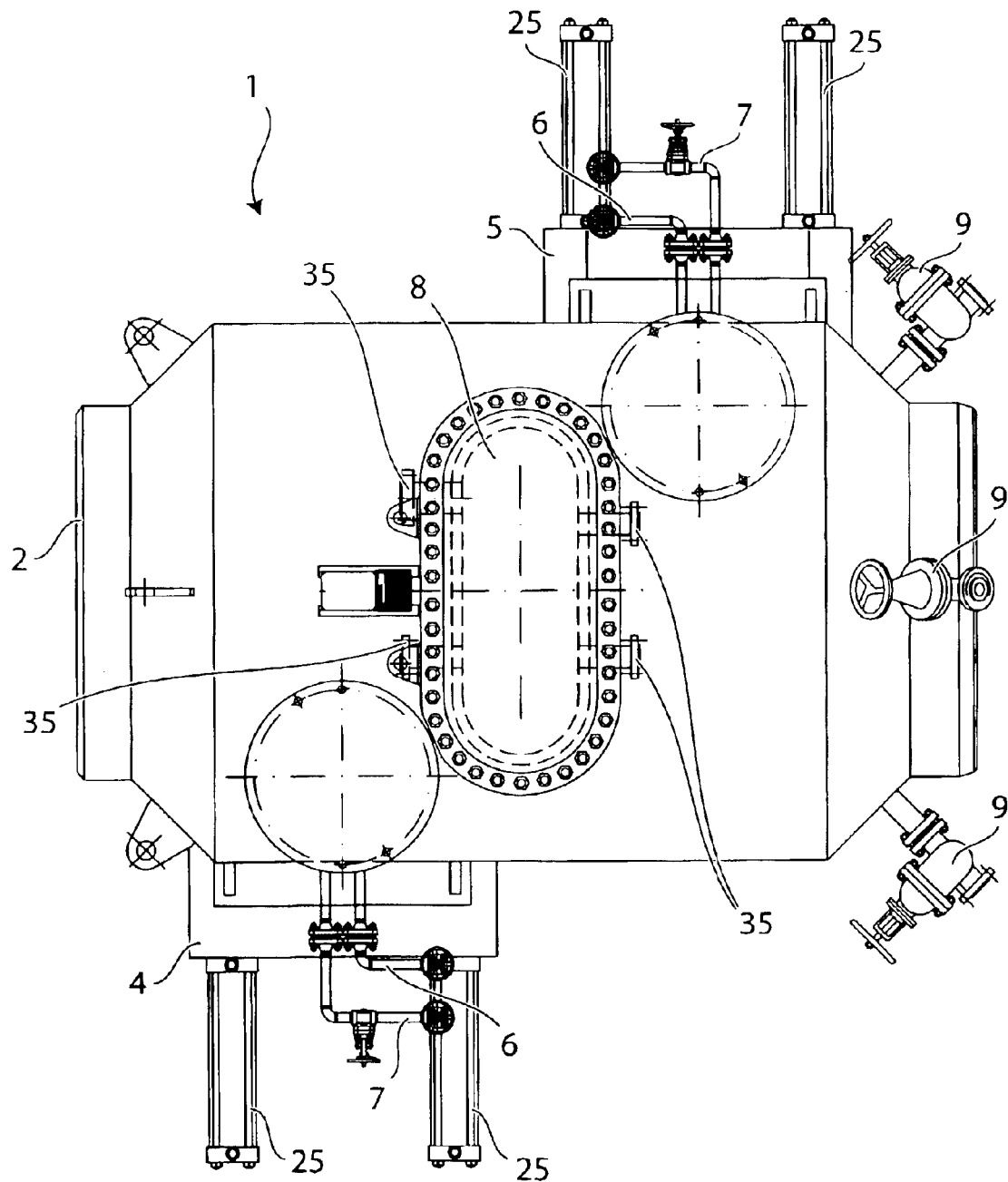
FIG. 3 is a second lateral view of the valve of FIG. 1.

Making reference to FIG. 2, it is possible to observe the offset positioning of the actuators 4 and 5, to minimize interferences between shutters during their movements, while FIG. 3 allows to see the inspection window 8, closed by a flanged disc.

Figure 4:
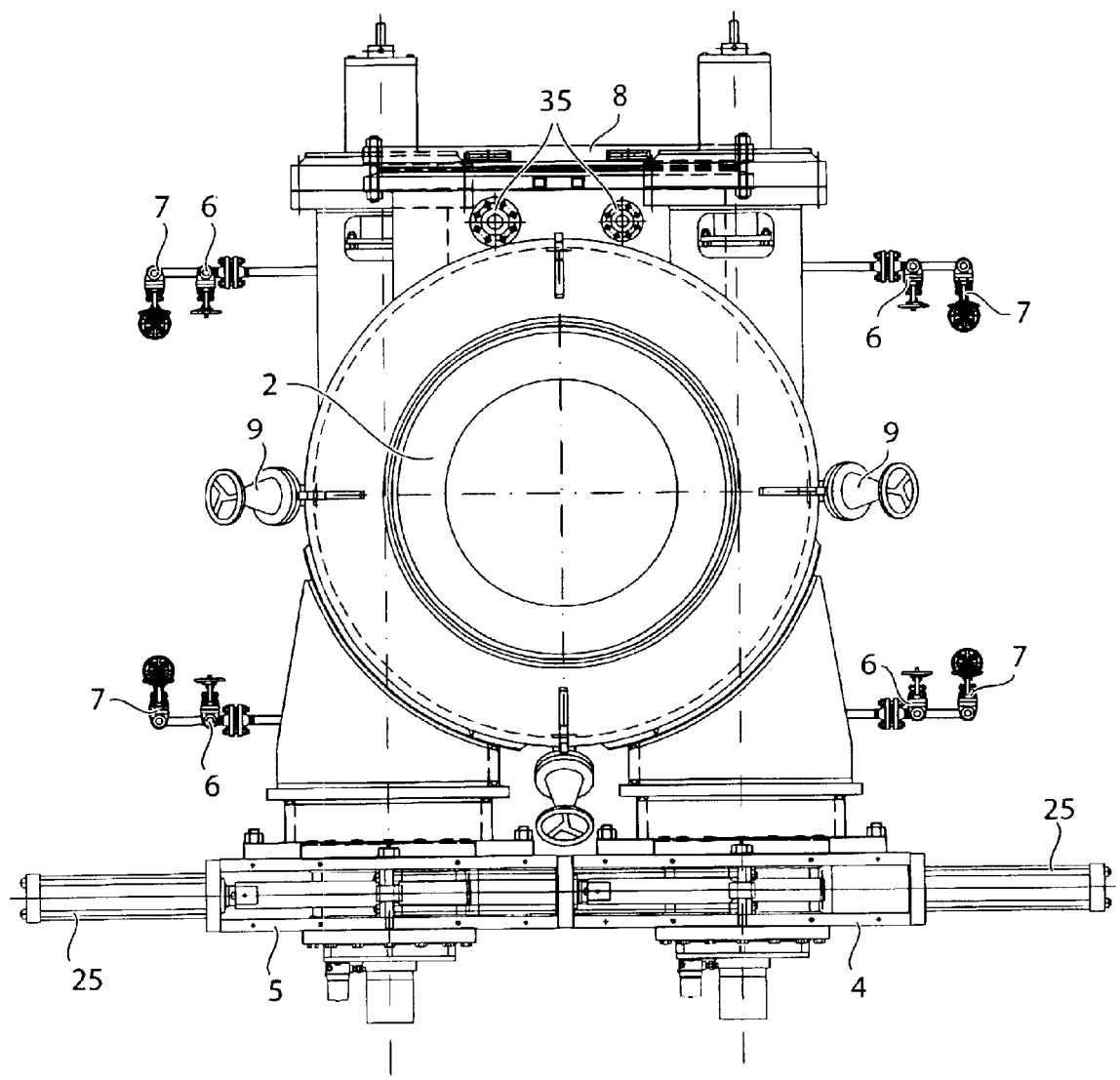
FIG. 4 is a top view of the valve of FIG. 1.

FIG. 4 puts into evidence that the bonification conduits 6 are realized in correspondence of the two sections, for each drive shaft, from which gas leakages are possible, as a consequence of the clearance necessary for the movement of the drive shaft.

Figure 5:
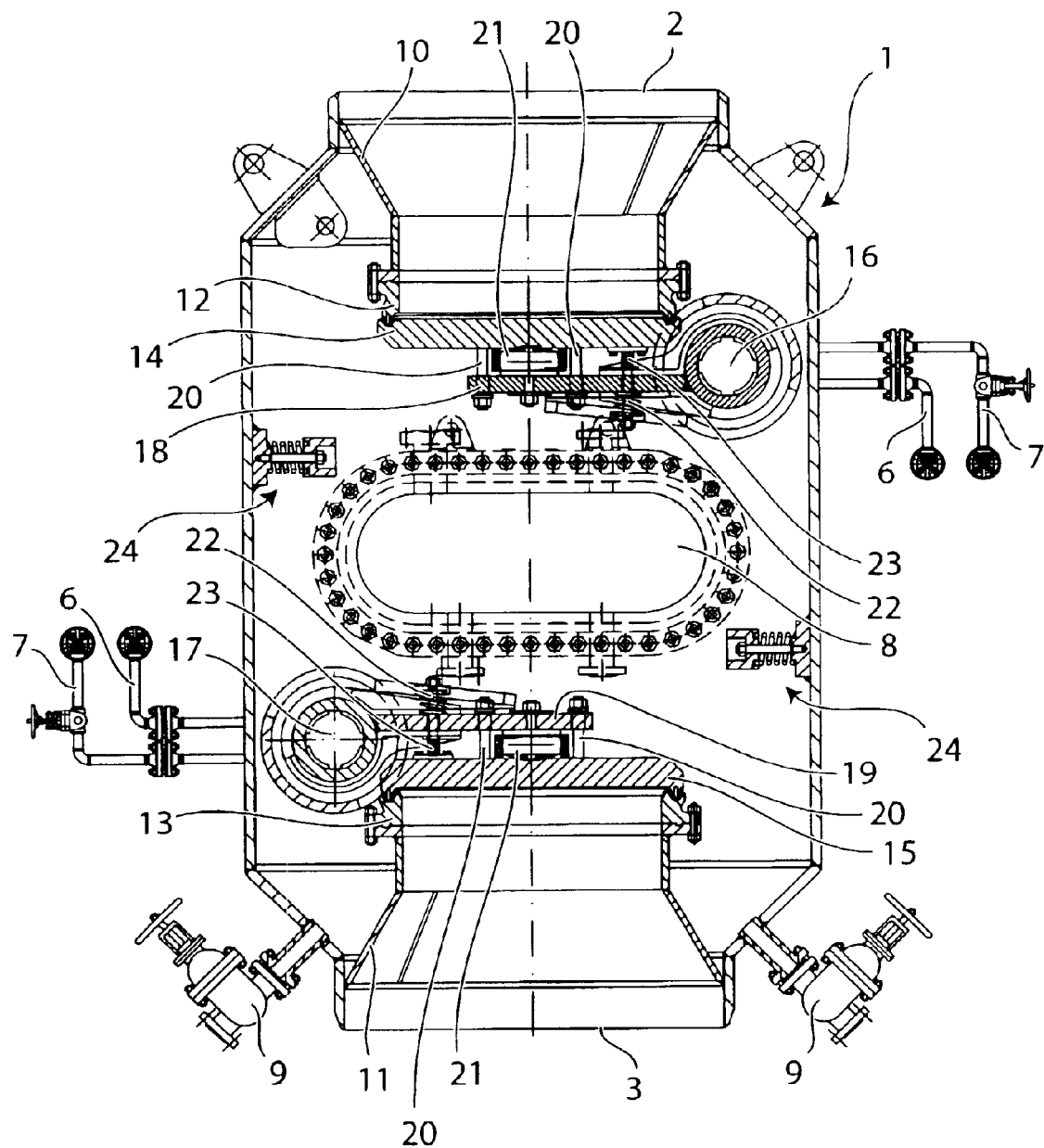
FIG. 5 is a section view of the valve of FIG. 1 taken along line A—A.

FIG. 5 shows the inside of the valve. Particularly, a conduit 10 for the inlet of the gas, having its tapered outer part coupled with the opening 2, and a conduit 11 for the outlet of the gas, having its tapered outer part coupled with the opening 3, both having the inner end cylindrically shaped, on which the two seats 12 and 13 are coupled by flanging, said seats being respectively closed by the shutters 14 and 15.

Shutters 14 and 15 are respectively operated by the actuators 4 and 5, conferring a rotating movement, respectively to the drive shafts 16 and 17, and, by the same, to the drive arms 18 and 19.

Distance between the two seats 12 and 13 must be studied in such a way to minimize the turbulence into the gaseous fluid with open valve and to avoid that, during the movement, a shutter interferes with the other one.

To optimize this effect, two shutters can move in sequence. Preferably, shutter 15 faced toward the outlet of the valve will close first, and then the shutter 14 faced toward the inlet of the valve. In this way, closure motion of the shutter 15 close to the outlet of the valve will be simplified by the fact that it is directed according to the same direction of the gas flow passing through the valve, and that the pressure difference established when closing the shutter 15 on the seat 13 thrusts in the same direction; once closed the first shutter 15, the gas flow is interrupted and the pressure before and after the seat 12 of the second shutter 14 equalizes, thus not being an obstacle to the closure of the same.

When the valve is closed, the introduction of overpressurized inert gas within the zone between the two shutters guarantees a further improvement of the interception action, thus being an insurmountable obstacle for the passage of the fluid along the line. In this way, a substantially optimum sealing is obtained.

Each shutter is coupled to the relevant drive arm by an articulation allowing to the shutter to move to adapt to the seat during the sealing coupling between shutter and seat.

To this end, each shutter is coupled with the relevant arm by a plurality of threaded pins 20, placed about the center of the shutter, among which a spherical joint is placed. Each threaded pin is rigidly connected with the shutter and loosely passes through a corresponding hole of the drive arm, being provided on the free end with an enlargement, for example comprised of a nut, to prevent that the pin can completely come out from the arm hole.

Detailed studies to optimize the engagement motion of the shutter within the seat allowed to establish that it is advantageous make resting on the seat first the end of the shutter farther from the drive shaft, i.e. from the rotation angle. To make it possible this kind of movement, two systems are provided having a spiral spring 22, that, acting on a pin 23 coupled to the shutter in such a way to rotate about an axis provided close to the shutter and transversal with respect to the direction of the drive arm, approaching the end of the shutter closer to the drive shaft to the drive arm.

Within said valve body are finally provided two spring mechanical stops 24, with which the shutter is in touch in at the moment of the total opening, i.e. the maximum rotation allowed by the drive shaft.

Figure 6:
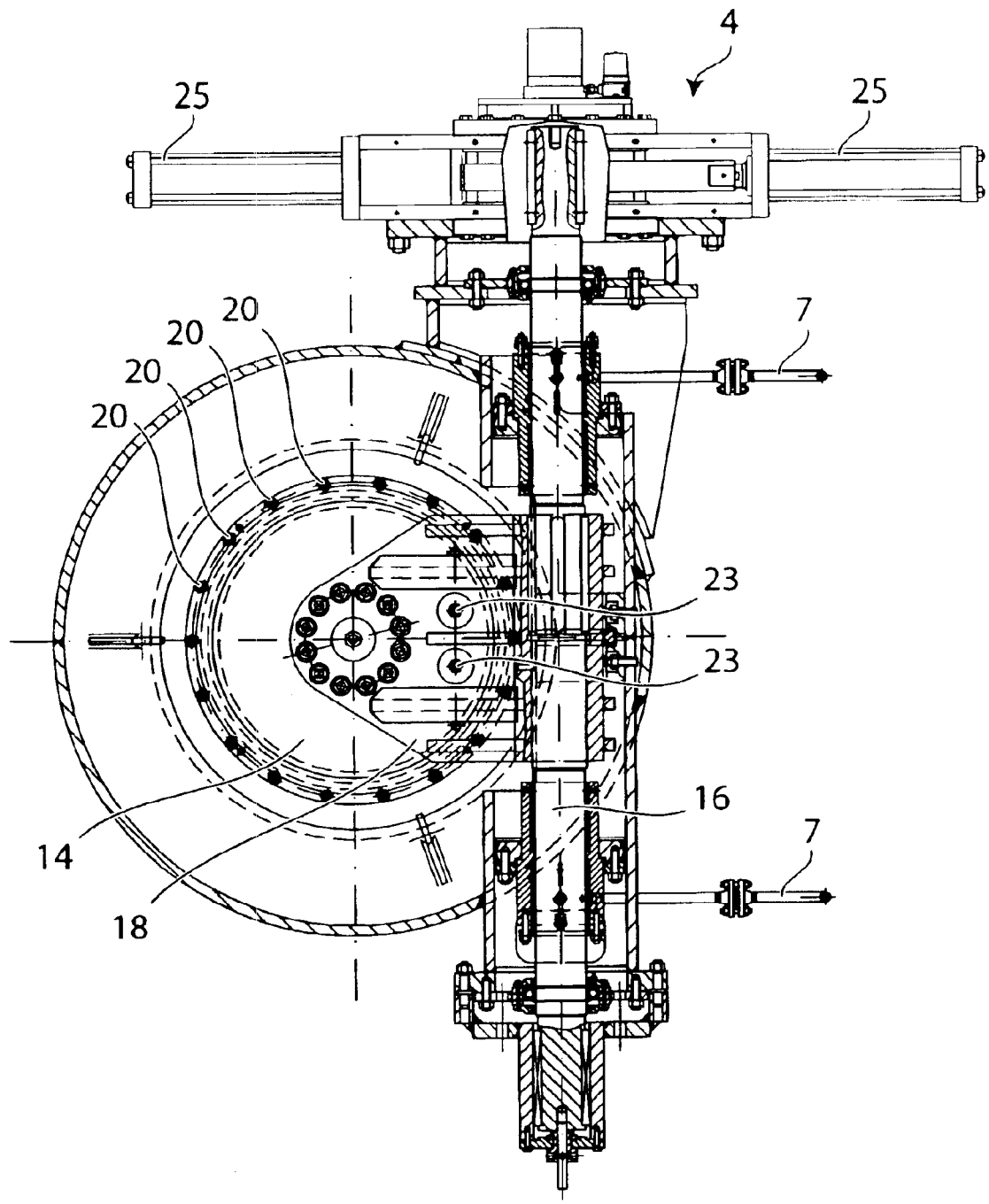
FIG. 6 is a section view of the valve of FIG. 1 along line B—B.

FIG. 6 shows that the translating movement of the rods 25 in the actuator 4 generates a rotary movement of the drive shaft 16, rotating about its own axis, transmitting its circular movement to the drive arm 18 and then to the shutter 14. Furthermore, they are shown the threaded pins 20 and the pins 23, respectively destined to couple in a not rigid way shutter 14 with the drive arm 18 and to approach the end of the shutter closer to the drive shaft to the drive arm.

It is further shown the point of joint of the lubrication conducts 7 on the drive shaft.

Figure 7:
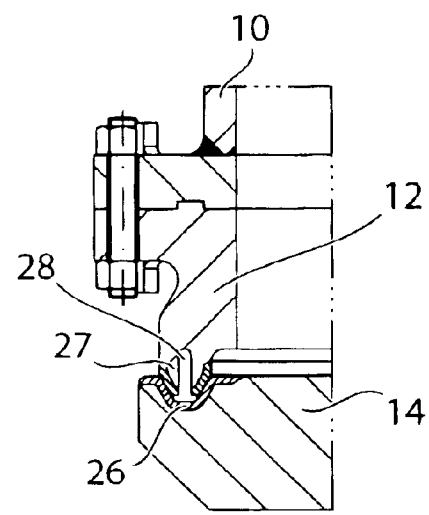
FIG. 7 is a section view of a particular of a shutter sealing engaged on its seat according to a first embodiment.
Figure 8:
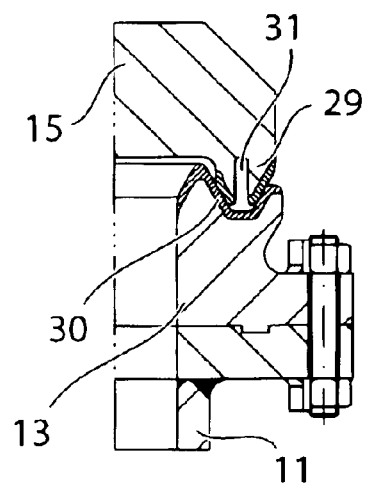
FIG. 8 is a section view of a particular of a shutter sealing engaged on its seat according to a second embodiment.

FIG. 7 and FIG. 8 are section views of a particular relevant to the contact surfaces between shutter and the relevant seat, according to two different embodiments of the coupling.

Particularly, in FIG. 7, shutter 14 has, close to its perimeter and all along its length, a groove 26, wherein a corresponding rib 27 realized in its seat 12 couples. Rib 27 is also provided with a narrower and lengthened groove 28, to improve the seal. The seat 12 is fixed to the gas inlet conduit 10 by flanging.

On the contrary, shutter of FIG. 8 has a rib 29 close to its perimeter and all its length, engaging in a corresponding groove 30 realized in its seat 13. As in the previous case, rib 29 is provided with a groove 31 comprising a circular room improving the seal of the system and increasing the load losses.

Figure 9:
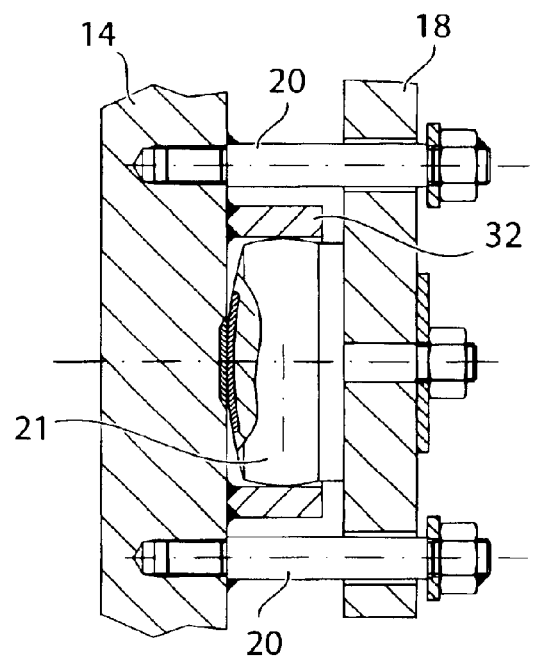
FIG. 9 is a section view of the articulation connecting shutter and drive arm.

Making reference to FIG. 9, it is shown a particular of the connection articulation between shutter 14 and drive arm 18. Particularly, two of the threaded pins 20 and the spherical joint 21 are shown, the latter being coupled on one side to the drive arm 18 and on the other side, in correspondence of its spherical surface, contacting the shutter 14. Advantageously, the translatory movements of the shutter with respect to the arm are prevented inserting the spherical joint 21 within a cylindrical chamber.

Figure 10:
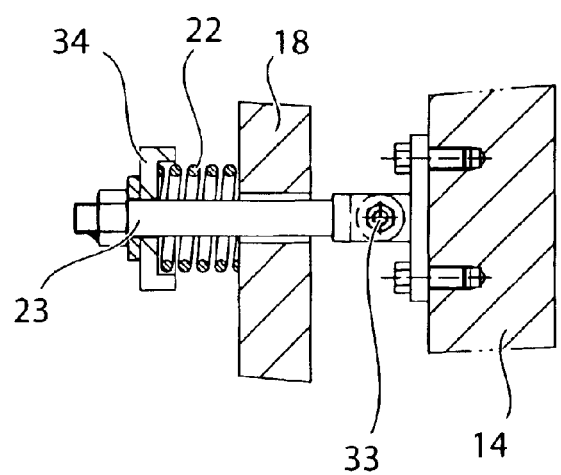
FIG. 10 is a section view of the positioning system between shutter and drive arm.

FIG. 10 particularly shows the relative positioning system between shutter and drive arm. Particularly, it is shown the pin 23, obliged to move about the rotation axis 33, integral with the shutter 14. At the free end of the pin 23 it is provided a seat 34 of the spring 22, said spring thrusting the seat 34 and the pin 23 and the shutter 14, in such a way that said shutter, or its end closed to the drive arm, approaches to the drive arm, as it is wished to optimize the engagement of the shutter 14 on the relevant seat 12.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. On-off valve, particularly for insulation by-pass of exhaust gas expansion turbines of catalytic cracking plants, of the type comprising a hollow valve body, an opening for the inlet of the gas into the valve, an opening for the outlet of the gas from the valve, at least a shutter and at least one seat, said valve comprising a conduit coupled to the inlet opening and a conduit coupled to the outlet opening, said at least one seat being coupled to the inlet conduit or to the outlet conduit and said at least one shutter having a cover shape and sealing engaging with said seat by a rotatory motion transmitted to the shutter by an actuator by a drive shaft and a drive arm.

2. On-off valve according to claim 1, wherein said at least one shutter is two shutters, each one with a seat, respectively in correspondence of the inlet conduit and of the outlet conduit.

3. On-off valve according to claim 2, characterized in that said seats are spaced from each other to minimize the flow turbulence of the gas crossing the valve when open and the interference of the opening and closure movements of the two shutters.

4. On-off valve according to one of the preceding claims 1–3, characterized in that said at least one shutter is provided with a rib adjacent to, and all along, a perimeter, sealing engaging on a corresponding groove on the seat, of with a groove adjacent to, and all along, a perimeter, sealing engaging on corresponding rib on the seat.

5. On-off valve according to one of the preceding claims 1–3, characterized in that said at least one shutter is provided with a groove close and all along a its perimeter, seal engaging on a corresponding rib provided on the seat.

6. On-off valve according to claim 2, characterized in that the shutter faced toward the valve inlet is provided with a groove for engagement with a rib on the relevant seat while that one faced toward the outlet of the valve is provided with a rib for engagement on a groove on the relevant seat.

7. On-off valve according to claim 4, characterized in that said rib is cut from a lengthened groove.

8. On-off valve according to claim 1, characterized in that said shutter is coupled to said drive arm by an articulation leaving to the shutter the possibility of conforming to the seat during the closure operation.

9. On-off valve according to claim 8, characterized in that said articulation comprises a plurality of threaded pins provided about the center of the shutter, limiting the amplitude of the movements of the shutter about the drive arm, and at the center of which a spherical joint is provided.

10. On-off valve according to claim 1, further comprising means for the positioning of the shutter with respect to the drive arm during its approaching to a relevant seat.

11. On-off valve according to claim 10, characterized in that said positioning means comprise at least a spiral spring resting on the drive arm and acting on a pin constrained to the end of the shutter closer to the drive shaft, approaching said shutter end to said drive arm.

12. On-off valve according to one of the preceding claims 8–11, a mechanical stop for each shutter limiting the maximum opening of the same.

13. On-off valve according to claim 1, further comprising at least a bonification conduit for inlet of overpressure gas within the valve, e.g. nitrogen.

14. On-off according to claim 1, further comprising at least a conduit lubrication of moving elements within the valve.

15. On-off valve according to claim 1, further comprising at least one valve for evacuation of possibly present liquids.

16. On-off valve according to claim 1, further comprising at least an inspection window.

17. An insulation by-pass of an exhaust gas expansion turbine of a catalytic cracking plant, comprising in a conduit through which a fluid passes, particularly a gaseous fluid, two valves in accordance with claim 1, placed in two different points of the conduit.

18. On-off valve according to claim 5, characterized in that said rib is cut from a lengthened groove.

19. On-off valve according to claim 6, characterized in that said rib is cut from a lengthened groove.

* * * * *